United States Patent [19]

Michibayashi et al.

[11] Patent Number: 5,680,190
[45] Date of Patent: Oct. 21, 1997

[54] LIQUID CRYSTAL DISPLAY APPARATUS INCLUDING THE SAME TRANSPARENT MATERIAL IN THE TFT SEMICONDUCTOR LAYER AND A SUB-PIXEL ELECTRODE

[75] Inventors: Akiko Michibayashi; Tetsuya Kawamura; Mamoru Furuta, all of Hirakata; Yutaka Miyata, Ikoma, all of Japan

[73] Assignee: Matsushita Electric Industrial Co., Ltd., Osaka, Japan

[21] Appl. No.: 456,563

[22] Filed: Jun. 1, 1995

[30] Foreign Application Priority Data

Jun. 2, 1994 [JP] Japan ............................ 6-120927

[51] Int. Cl.$^6$ ............................................. G02F 1/1343
[52] U.S. Cl. .................................... 349/140; 349/147
[58] Field of Search .................... 359/59, 54, 87; 349/140, 144, 147

[56] References Cited

U.S. PATENT DOCUMENTS

| | | |
|---|---|---|
| 5,191,453 | 3/1993 | Okumura . |
| 5,319,480 | 6/1994 | McCartney ........................ 359/59 |
| 5,396,262 | 3/1995 | Hasting, III ........................ 359/59 |
| 5,471,330 | 11/1995 | Sarma ............................ 359/59 |
| 5,483,366 | 1/1996 | Atharton ........................... 359/59 |

FOREIGN PATENT DOCUMENTS

| | | |
|---|---|---|
| 0 348 209 | 12/1989 | European Pat. Off. . |
| 0 562 120 | 9/1993 | European Pat. Off. . |
| 63-119257 | 5/1988 | Japan . |
| 5-107556 | 4/1993 | Japan . |

OTHER PUBLICATIONS

Sunata, T., et al., "A Wide–Viewing–Angle 10–Inch–Diagonal Full–Color Active–Matrix LCD Using a Halftone–Grayscale Method", *1991 International Display Research Conference*, pp. 255–257.

*Primary Examiner*—William L. Sikes
*Assistant Examiner*—James A. Dudek
*Attorney, Agent, or Firm*—Ratner & Prestia

[57] ABSTRACT

A liquid crystal display apparatus includes: a liquid crystal layer; a first substrate and a second substrate interposing the liquid crystal layer therebetween; a pixel electrode and a counter electrode respectively provided on opposing faces of the first substrate and the second substrate for applying a voltage to the liquid crystal layer; and a thin-film transistor provided on the first substrate and electrically connected to the pixel electrode, the thin-film transistor including a semiconductor layer having a source region and a drain region, wherein the pixel electrode is divided into a first sub-pixel electrode and a second sub-pixel electrode; parts of the first and second sub-pixel electrodes are overlapped via an insulating layer with each other; and at least one of the first and second sub-pixel electrodes is made of the same transparent material as a material for the semiconductor layer.

14 Claims, 10 Drawing Sheets

5,680,190

1

LIQUID CRYSTAL DISPLAY APPARATUS INCLUDING THE SAME TRANSPARENT MATERIAL IN THE TFT SEMICONDUCTOR LAYER AND A SUB-PIXEL ELECTRODE

BACKGROUND OF THE INVENTION

1. Field of the Invention

The present invention relates to a liquid crystal display device (LCD), more specifically to a liquid crystal display device having a wide viewing angle.

2. Description of the Related Art

As an exemplary method for enlarging the viewing angle of an LCD, a technique for dividing a pixel electrode on a thin-film transistor (TFT) substrate into a plurality of portions to be connected to each other via capacitors has been known.

According to a first conventional example, three small pixel electrodes, constituted by transparent indium tin oxide (ITO) electrodes, and a TFT are formed on a transparent substrate made of glass or the like. The three small pixel electrodes are disposed in two layers. One of the three small pixel electrodes is directly connected to a source electrode or a drain electrode of the TFT, while the other two small pixel electrodes are connected to the source electrode or the drain electrode of the TFT via serial capacitors. According to this method, a pixel electrode is divided into three small pixel electrodes and the small pixel electrode are disposed so as to form a double-layered structure with an insulating layer, so that a capacitor is formed in an overlapping portion between an ITO electrode in a first layer and an ITO electrode in a second layer, and the three small pixel electrodes are electrically connected to each other via the capacitor. Such a kind of methods for enlarging the viewing angle of an LCD by dividing one pixel electrode into a plurality of portions are disclosed, for example, in "International Display Research Conference", (1991), pp. 255–257, and Japanese Laid-Open Patent Publication No. 5-107556. Hereinafter, the above-described configuration will be called a "double-layered pixel electrode structure".

This method utilizes a voltage-transmittance characteristic of a twisted nematic (TN) type LCD, i.e., the viewing angle dependence of the LCD becomes small in the region where the transmittance is substantially saturated. In the above-described double-layered pixel electrode structure, by providing different voltage-transmittance characteristics for the divided small pixel electrodes, a plurality of regions having respectively different intensities of the fields to be applied to a liquid crystal layer can be formed within a single pixel. Therefore, by forming a region in which a transmittance is substantially saturated inside a pixel for a grayscale tone display, the viewing angle of the LCD can be enlarged.

According to a second conventional example, two small pixel electrodes which are constituted by a single-layered transparent indium tin oxide (ITO) electrode, an electrode made of a gate electrode material and a TFT are formed on a transparent substrate made of glass or the like. One of the two small pixel electrodes is directly connected to a source electrode and a drain electrode of the TFT, while the other small pixel electrode and the electrode made of a gate electrode material are connected to the source electrode and the drain electrode of the TFT via serial capacitors. In this case, the electrode made of a gate electrode material is used for electrically connecting the two divided small pixel electrodes, and the capacitors are formed in the overlapping portions between the electrode made of a gate electrode material and the two small pixel electrodes, thereby electrically connecting the two small pixel electrodes via the capacitors. Hereinafter, the above-described configuration will be called a "single-layered pixel electrode structure".

In both of the above-described two methods, a pixel electrode is divided into a plurality of portions via a capacitor.

However, according to the double-layered pixel electrode structure, transparent ITO electrodes for constituting the small pixel electrodes are required to be formed twice, so that the process for fabricating the TFT substrate becomes complicated and therefore the necessary costs disadvantageously increases. On the other hand, according to the single-layered pixel electrode structure, the material for a gate electrode is non-transparent, and a gap is formed between the divided small pixel electrodes, so that the numerical aperture of the pixel adversely decreases.

SUMMARY OF THE INVENTION

The liquid crystal display apparatus of this invention, includes: a liquid crystal layer; a first substrate and a second substrate interposing the liquid crystal layer therebetween; a pixel electrode and a counter electrode respectively provided on opposing faces of the first substrate and the second substrate for applying a voltage to the liquid crystal layer; and a thin-film transistor provided on the first substrate and electrically connected to the pixel electrode, the thin-film transistor including a semiconductor layer having a source region and a drain region, wherein the pixel electrode is divided into a first sub-pixel electrode and a second sub-pixel electrode; parts of the first and second sub-pixel electrodes are overlapped via an insulating layer with each other; and at least one of the first and second sub-pixel electrodes is made of the same transparent material as a material for the semiconductor layer.

Another aspect of the invention, a liquid crystal display apparatus includes: a liquid crystal layer; a first substrate and a second substrate interposing the liquid crystal layer therebetween; a pixel electrode and a counter electrode respectively provided on opposing faces of the first substrate and the second substrate for applying a voltage to the liquid crystal layer; and a thin-film transistor provided on the first substrate and electrically connected to the pixel electrode, the thin-film transistor having a gate electrode, wherein the pixel electrode is divided into a first sub-pixel electrode and a second sub-pixel electrode; parts of the first and second sub-pixel electrodes are overlapped via an insulating layer with each other; and at least one of the first and second sub-pixel electrodes is made of the same transparent material as a material for the gate electrode.

In one embodiment of the invention, at lease one of the first and second sub-pixel electrode is divided into a plurality of sub-pixel electrode portions.

In another embodiment of the invention, the semiconductor layer and at least one of the first and second sub-pixel electrodes are made of polycrystalline silicon.

In still another embodiment of the invention, the gate electrode and at least one of the first and second sub-pixel electrodes are made of polycrystalline silicon.

In still another embodiment of the invention, the first sub-pixel electrode has a hole in a portion thereof overlapping the second sub-pixel electrode, and the insulating layer is embedded in the hole.

In still another embodiment of the invention, a through hole is provided through the insulating layer interposed between the first sub-pixel electrode and the second sub-pixel electrode, and the first and second sub-pixel electrodes are electrically connected to each other via the through hole.

In still another embodiment of the invention, the liquid crystal layer is made of a TN type liquid crystal.

In still another embodiment of the invention, the thin-film transistor has a top-gate structure or a bottom-gate structure.

According to the present invention, by dividing a pixel electrode into a plurality of portions, i.e., a first sub-pixel electrode and a second sub-pixel electrode, the voltage to be applied to the liquid crystal layer can be differentiated in multiple levels, so that it becomes possible to further enlarge a viewing angle range. Therefore, a liquid crystal display apparatus with a high display definition can be obtained. In addition, even if one capacitor is short-circuited so as to generate a defective pixel, such a defect will not be recognizable as a whole so long as the other pixel electrodes operates normally. Accordingly, it is also possible for the pixel to have a redundancy.

Moreover, according to the first method of the invention, since either the first sub-pixel electrode or the second sub-pixel electrode and a semiconductor layer constituting a part of the TFT are made of the same transparent material, the first or second sub-pixel electrode and the semiconductor layer can be formed simultaneously. Thus even if the pixel electrode has a double-layered structure, it is no longer necessary to increase the number of the fabrication process steps or change the order thereof unlike a conventional method. In the method of the invention, it is only necessary to change the pattern of the semiconductor layer. Consequently, according to the invention, the throughput is improved and the fabrication cost can be reduced as compared with the case of using a conventional double-layered pixel electrode structure.

Moreover, according to a second method of the invention, since either the first sub-pixel electrode or the second sub-pixel electrode and a gate electrode of the TFT are made of the same transparent material, the first or second sub-pixel electrode and the gate electrode of the TFT can be formed simultaneously. Thus even if the pixel electrode has a double-layered structure, it is no longer necessary to increase the number of the fabrication process steps or change the order thereof unlike a conventional method. In the method of the invention, it is only necessary to change the pattern of the gate electrode. Consequently, according to the invention, the throughput is improved and the fabrication cost can be reduced as compared with the case of using a conventional double-layered pixel electrode structure. In addition, unlike the case of using a conventional single-layered pixel electrode structure, the numerical aperture of the pixel is not reduced even when a gate electrode material is used for forming a capacitor, and therefore it is possible to divide the pixel electrode into a plurality of portions.

Thus, the invention described herein makes possible the advantage of providing a liquid crystal display apparatus having a wide viewing angle allowing for a high definition display without complicating the fabrication process of a TFT substrate and without reducing the numerical aperture of the pixel.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1A:
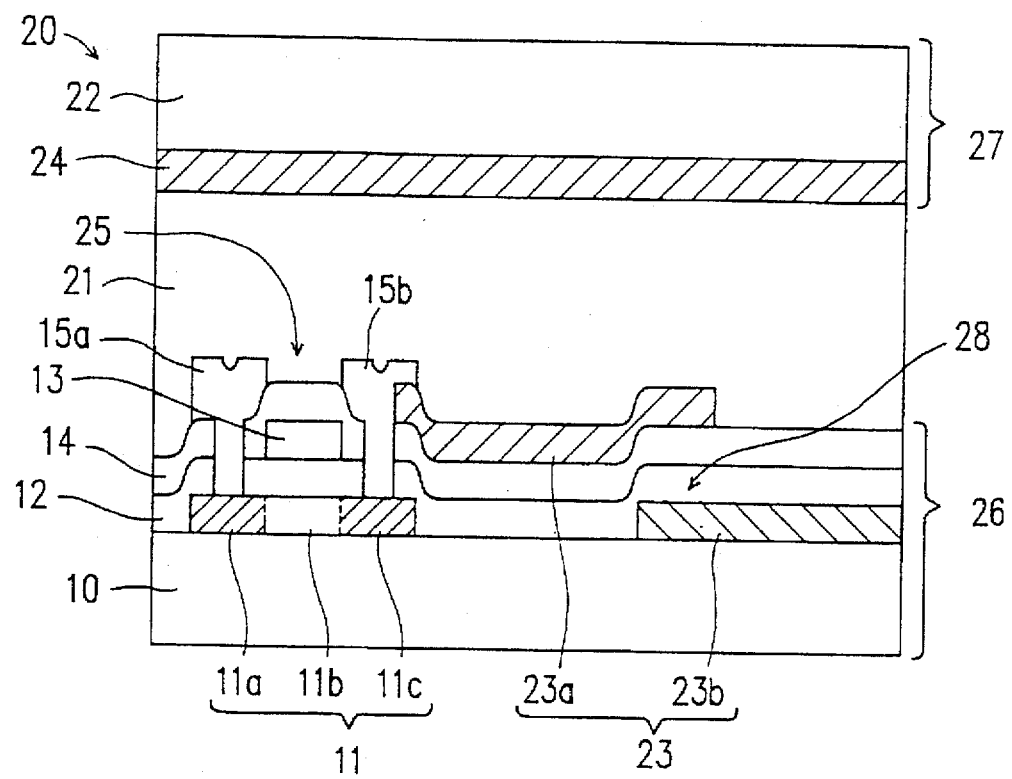
FIG. 1A is a cross-sectional view showing a configuration of a liquid crystal display apparatus according to a first example of the invention.
Figure 1B:
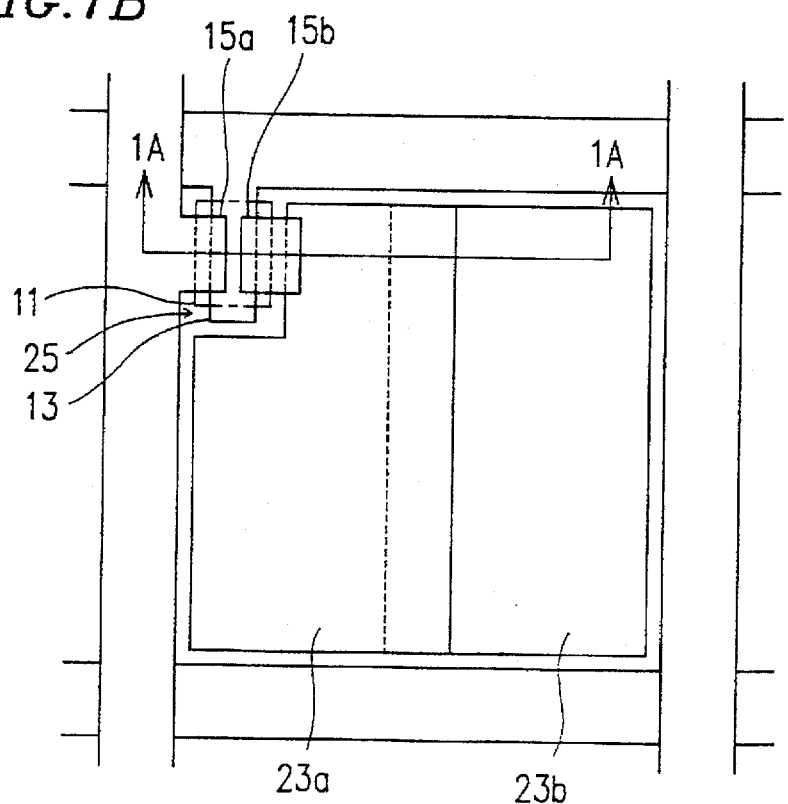
FIG. 1B is a plan view showing a configuration of a TFT substrate of a liquid crystal display apparatus according to the first example of the invention.

FIG. 1A is a cross-sectional view showing a configuration of a liquid crystal display apparatus (LCD) according to a first example of the invention, and FIG. 1B is a plan view thereof.

An LCD 20 includes: a liquid crystal layer 21; a first substrate 10 and a second substrate 22, made of glass or the like, which are provided so as to interpose the liquid crystal layer 21; a pixel electrode 23 provided on the surface of the first substrate 10 so as to face the liquid crystal layer 21; and a counter electrode 24 provided on the surface of the second substrate 22 so as to face the liquid crystal layer 21; and a thin-film transistor (TFT) 25 provided on the surface of the first substrate 10. The pixel electrode 23 is electrically connected to the TFT 25, and a voltage is applied to the liquid crystal layer 21 interposed between the pixel electrode 23 and the counter electrode 24 in accordance with the switching operation of the TFT 25. Hereinafter, the first substrate 10 including the TFT 25 and the pixel electrode 23 will be called a TFT substrate 26, and the second substrate 22 including the counter electrode 24 will be called a counter substrate 27.

In the TFT 25, a semiconductor layer 11 made of polycrystalline silicon (poly-silicon) is formed on the first substrate 10; a gate insulating film 12 is formed so as to cover the semiconductor layer 11; a gate electrode 13 made of a metal material such as Ta is formed on the gate insulating film 12; a channel region 11b is formed under gate electrode 13 in the semiconductor layer 11; and a source region 11a and a drain region 11c are formed so as to interpose the channel region 11b in the semiconductor layer 11.

In addition, an interlevel insulating film 14 is formed over the gate insulating film 12 so as to cover the gate electrode 13; and a source electrode 15a and a drain electrode 15b are further provided on the interlevel insulating film 14. The source electrode 15a and the drain electrode 15b are electrically connected to the source region 11a and the drain region 11c, respectively via the contact holes provided through the interlevel insulating film 14 and the gate insulating film 12.

On the other hand, the pixel electrode 23 is divided into two sub-pixel electrodes 23a and 23b. The sub-pixel electrodes 23a and 23b are formed on the interlevel insulating film 14 and the first substrate 10, respectively. A part of the sub-pixel electrode 23a is overlapped with a part of the sub-pixel electrodes 23b via the interlevel insulating film 14 and the gate insulating film 12. A capacitor is formed in the overlapping portion 28 between the two sub-pixel electrodes 23a and 23b, so that the two sub-pixel electrodes 23a and 23b are electrically connected to each other via the capacitor. The sub-pixel electrode 23a is further electrically connected to the drain electrode 15b.

Figure 12:
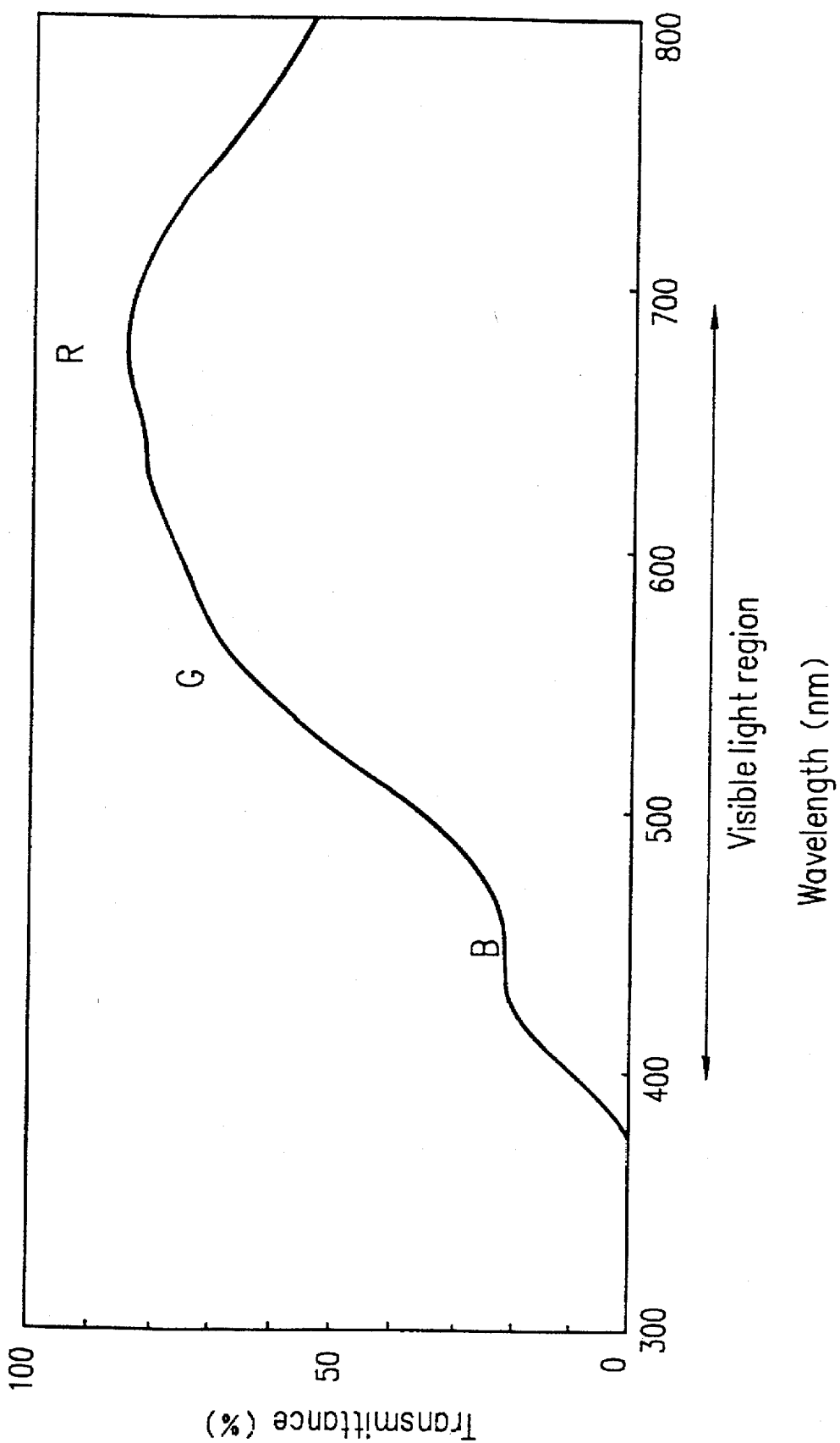
FIG. 12 is a graph showing the transmittance characteristics of polycrystalline silicon (poly-silicon) to be used according to the invention.

The sub-pixel electrode 23a is constituted by a transparent electrode made of ITO or the like. On the other hand, the sub-pixel electrode 23b is made of the same poly-silicon as the material for the semiconductor layer 11, and contains impurity in approximately the same concentration as that in the source region 11a and the drain region 11c. It is true that poly-silicon is a semiconductor, but poly-silicon with an appropriate thickness functions as a transparent electrode for transmitting visible light. FIG. 12 is a graph showing the transmittance characteristics of the poly-silicon film with a thickness of 85 nm. As is apparent from FIG. 12, an average transmittance in the entire visible light region is approximately 70%, and therefore the poly-silicon film sufficiently functions as a transparent electrode. It is noted that the thickness of the polysilicon film is preferably equal to or smaller than about 150 nm.

The liquid crystal display apparatus 20 is fabricated in the following manner.

First a poly-silicon film (not shown) with a thickness of about 85 nm is formed on the first substrate 10 made of glass or the like, and then patterned in the shapes of the semiconductor layer 11 and the sub-pixel electrode 23b. Alternatively, a poly-silicon film having a thickness more than 150 nm may be formed. In the case, after pattering the poly-silicon film, thickness of the portion to be the sub-pixel electrode 23b may be reduced by selectively etching. The gate insulating film 12 is formed on the first substrate 10 so as to cover the patterned poly-silicon film and the gate electrode 13 is formed on the gate insulating film 12. By implanting phosphorus ions into the patterned polysilicon film using the gate electrode 13 as a mask, the semiconductor layer 11 including the source region 11a, the channel region 11b and the drain region 11c and the sub-pixel electrode 23b are formed.

Next, the interlevel insulating film 14 is formed on the gate insulating film 12 so as to cover the gate electrode 13, and the sub-pixel electrode 23a made of ITO is formed on the interlevel insulating film 14. By providing the contact holes through the interlevel insulating film 14 and the gate insulating film 12, the source electrode 15a and the drain electrode 15b to be electrically connected to the source region 11a and the drain region 11c, respectively are formed, whereby the TFT substrate 26 is formed. Then, the counter substrate 27 provided with the counter electrode 24 on the second substrate 22 is formed. An alignment film (not shown) is provided on the surface on the electrode side of the TFT substrate 26 and the counter substrate 27, respectively.

Finally, the TFT substrate 26 and the counter substrate 27 are attached to each other so that the pixel electrode 23 faces the counter electrode 24, and then a TN type liquid crystal is injected into the gap between the substrates 26 and 27 so as to form a liquid crystal layer 21. The liquid crystal display apparatus 20 is completed in this way.

In the LCD 20 having the above-described configuration, the pixel electrode 23 is divided into the double-layered sub-pixel electrodes 23a and 23b which are electrically connected to each other via the capacitor. As a result, the voltage between the sub-pixel electrode 23a and the counter electrode 24 is different from the voltage between the sub-pixel electrode 23b and the counter electrode 24 within the one pixel. Accordingly, by providing different voltage-transmittance characteristics for the respective sub-pixel electrodes, a plurality of regions having different intensities of the fields to be applied to the liquid crystal layer can be formed within the one pixel. Therefore, by forming a region in which a transmittance is substantially saturated inside a pixel for a gray-scale tone display, the viewing angle of the LCD can be enlarged.

In addition, one of the sub-pixel electrodes (in the example, the sub-pixel electrode 23b) is formed by a polycrystalline silicon thin film at the same time as the formation of the semiconductor layer 11 constituting a part of the TFT, so that it is possible to divide the pixel electrode without increasing the number of the process steps for fabricating the TFT substrate though the pattern of the poly-silicon film should be changed. Moreover, the semiconductor layer 11 of the TFT is the polycrystalline silicon thin film, i.e., a transparent semiconductor thin film, so that it is possible to prevent the reduction of the numerical aperture of the pixel, which has adversely been caused in the case of using a non-transparent gate electrode material for forming a capacitor in a conventional single-layered pixel electrode structure, for example.

Furthermore, by adjusting the areas of the sub-pixel electrodes 23a and 23b or that of the overlapping portion 28, or the thickness of the interlevel insulating film 14 and the gate insulating film 12 in the overlapping portion 28, the voltage to be applied to the sub-pixel electrodes can be arbitrarily optimized depending on the applications of the electrodes and the characteristics of the liquid crystal layer 21, thereby enlarging the viewing angle.

Figure 2:
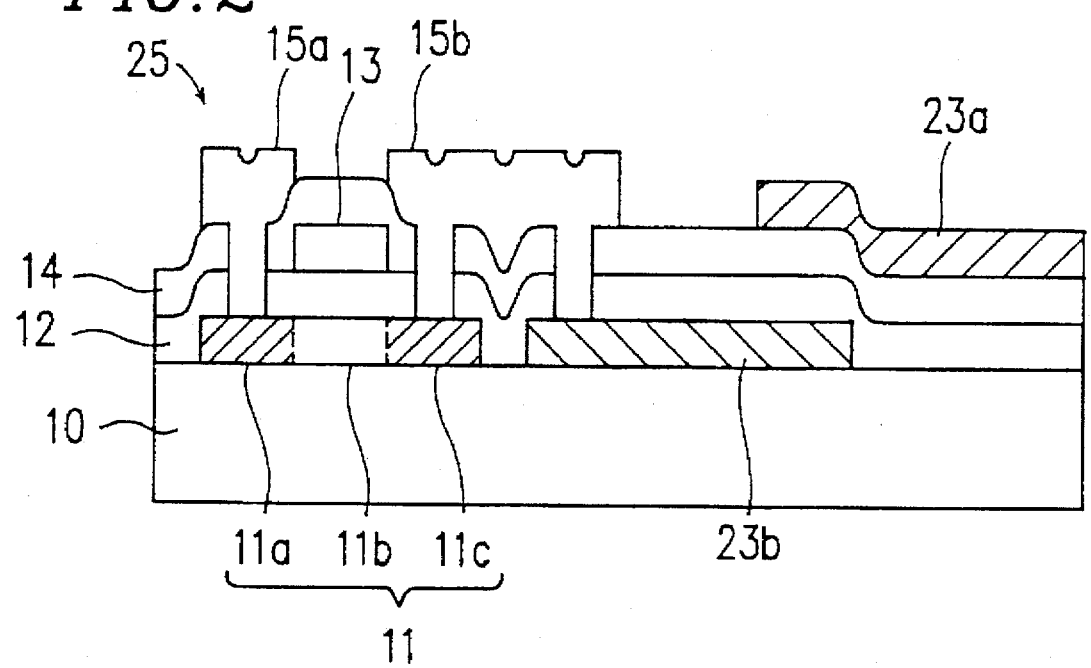
FIG. 2 is a cross-sectional view illustrating a modified example of the first example of the invention.

In this example, the drain electrode 15b of the TFT 25 is directly electrically connected to the sub-pixel electrode 23a made of ITO. Alternatively, by changing the planar dispositions of the sub-pixel electrodes 23a and 23b as shown in FIG. 2 so as to electrically connect the sub-pixel electrode 23b constituted by a polycrystalline silicon film to the TFT 25, it is also possible to obtain the same effects as those described above. In such a case, the drain electrode 15b may be connected to the sub-pixel electrode 23b as shown in FIG. 2, or the drain region 11c and the sub-pixel electrode 23b may be fabricated so as to form a continuous layer. Moreover, the sub-pixel electrode 23a may be formed by a polycrystalline silicon thin film.

EXAMPLE 2

Figure 3A:
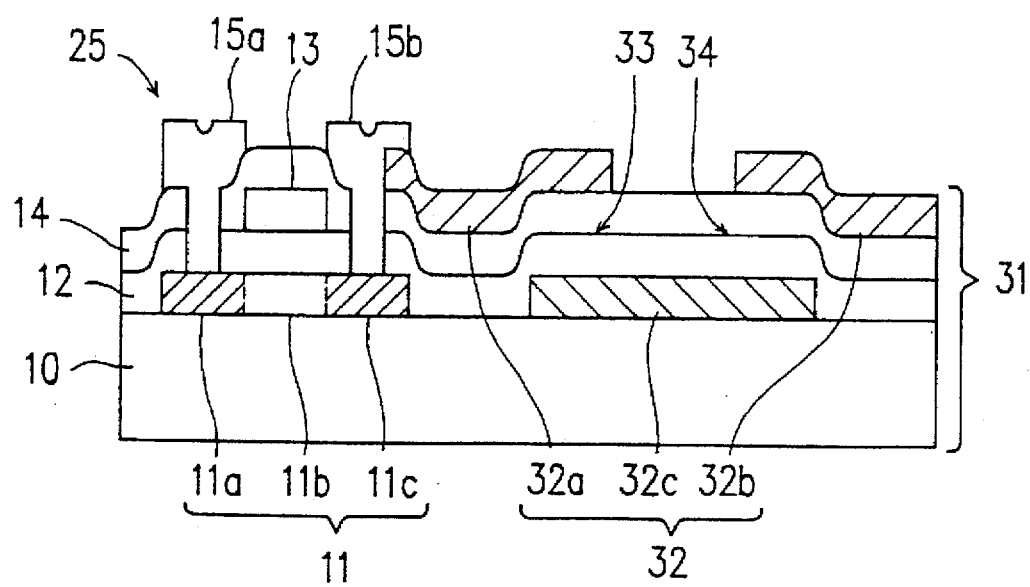
FIG. 3A is a cross-sectional view showing a configuration of a TFT substrate of a liquid crystal display apparatus according to a second example of the invention.
Figure 3B:
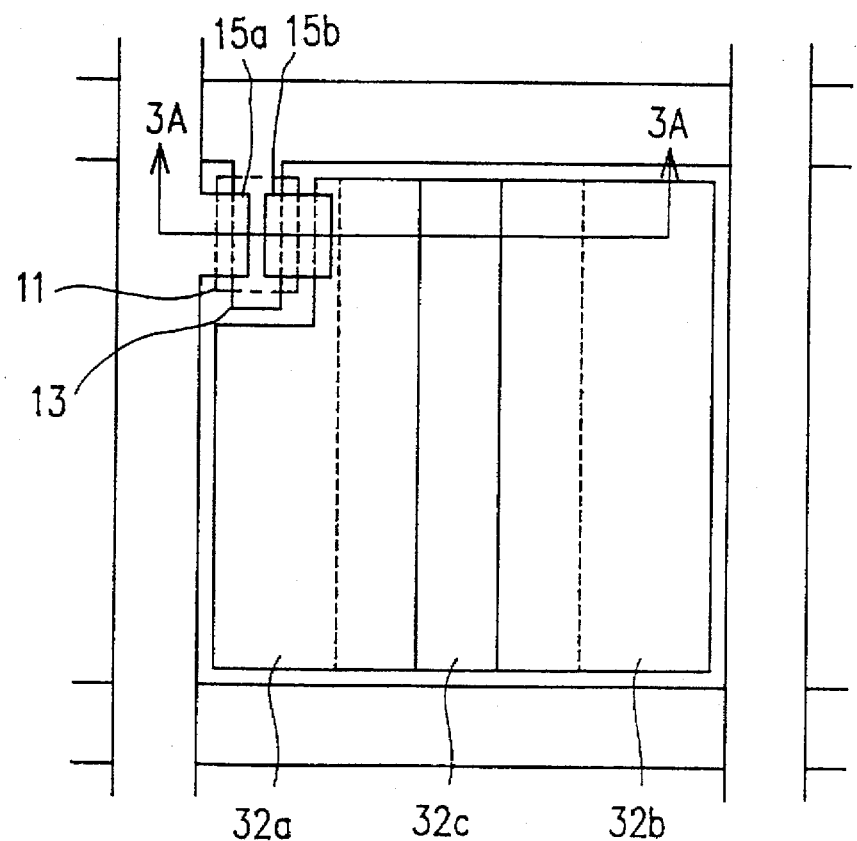
FIG. 3B is a plan view showing a configuration of a TFT substrate of a liquid crystal display apparatus according to the second example of the invention.

FIG. 3A is a cross-sectional view showing a configuration of a TFT substrate 31 for a liquid crystal display apparatus according to a second example of the invention, and FIG. 3B is a plan view thereof.

The LCD of this example is the same as the LCD 20 shown in FIG. 1A except that the TFT substrate 31 is used in place of the TFT substrate 26. The same components as those of the first example will be denoted by the same reference numerals.

As shown in FIG. 3A, a TFT 25 is formed on the first substrate 10, in the same way as in the first example. The LCD of the second example is different from the LCD of the first example in that the pixel electrode is divided into three portions. More specifically, sub-pixel electrodes 32a and 32b made of ITO are formed on the interlevel insulating film 14, and a sub-pixel electrode 32c made of poly-silicon is formed on the first substrate 10.

A part of the sub-pixel electrode 32a and a part of the sub-pixel electrode 32b are overlapped with parts of the sub-pixel electrodes 32c via the interlevel insulating film 14 and the gate insulating film 12. Capacitors are formed in the overlapping portions 33 and 34. Accordingly, the sub-pixel electrodes 32a, 32b and 32c are electrically connected to each other via the capacitors.

In the LCD having the above-described configuration, the pixel electrode 32 is divided into the three sub-pixel electrodes 32a, 32b and 32c in the two layers so as to be electrically connected to each other via the capacitors, so that the voltage between the sub-pixel electrode 32a and the counter electrode, the voltage between the sub-pixel electrode 32b and the counter electrode, and the voltage between the sub-pixel electrode 32c and the counter electrode are different from each other within the one pixel. Accordingly, by providing different voltage-transmittance characteristics for the sub-pixel electrodes, a plurality of regions having respectively different intensities of the fields to be applied to a liquid crystal layer can be formed within the one pixel. Therefore, by forming a region in which a transmittance is substantially saturated inside a pixel for a gray-scale tone display, the viewing angle of the LCD can be enlarged.

In addition, one of the sub-pixel electrodes (in the example, the sub-pixel electrode 32c) is formed by a polycrystalline silicon thin film at the same time as the formation of the semiconductor layer 11 constituting a part of the TFT, so that it is possible to divide the pixel electrode without increasing the number of the process steps for fabricating the TFT substrate though the pattern of the poly-silicon film should be changed. Moreover, the semiconductor layer 11 of the TFT is the polycrystalline silicon thin film, i.e., a transparent semiconductor thin film, so that it is possible to prevent the reduction of the numerical aperture of the pixel, which has adversely been caused in the case of using a non-transparent gate electrode material for forming a capacitor in a conventional single-layered pixel electrode structure, for example.

Figure 4:
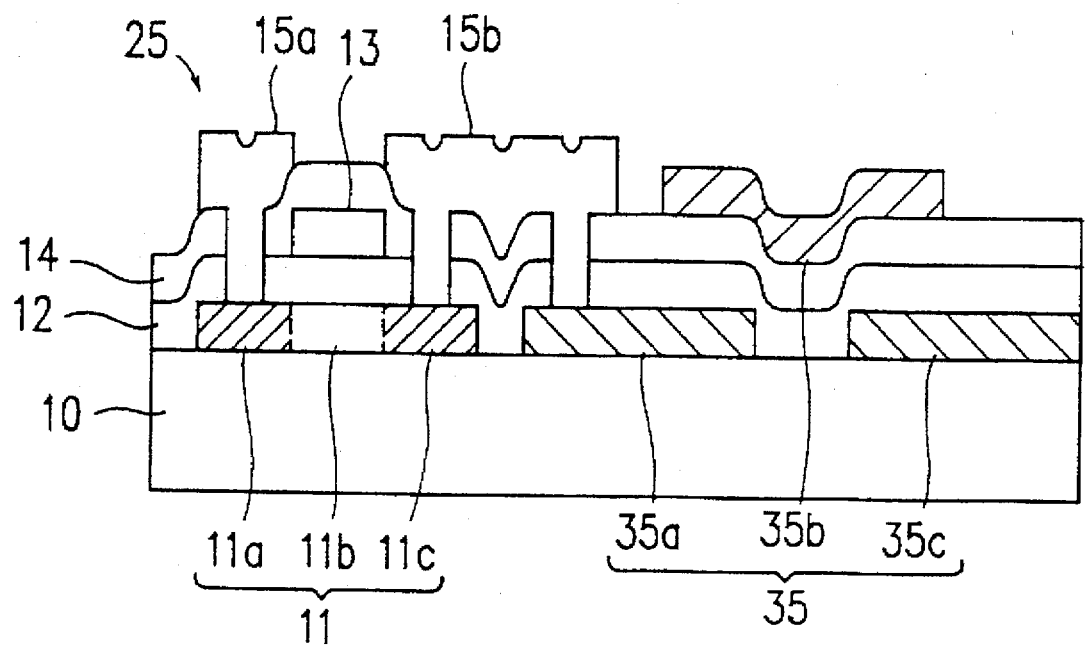
FIG. 4 is a cross-sectional view illustrating a modified example of the second example of the invention.

FIG. 4 is a cross-sectional view showing a modified example of the configuration of the TFT substrate 31 of the second example. By disposing the sub-pixel electrodes 35a and 35c made of poly-silicon in the first layer and disposing the sub-pixel electrode 35b made of ITO in the second layer as shown in FIG. 4, the same effects as those described above can be attained. In such a case, the drain electrode 15b may be connected directly to the sub-pixel electrode 35a as shown in FIG. 4, or the drain region 11c and the sub-pixel electrodes 35a may be fabricated so as to form a continuous layer. Moreover, the sub-pixel electrode 35b may be formed by a polycrystalline silicon thin film.

Figure 5:
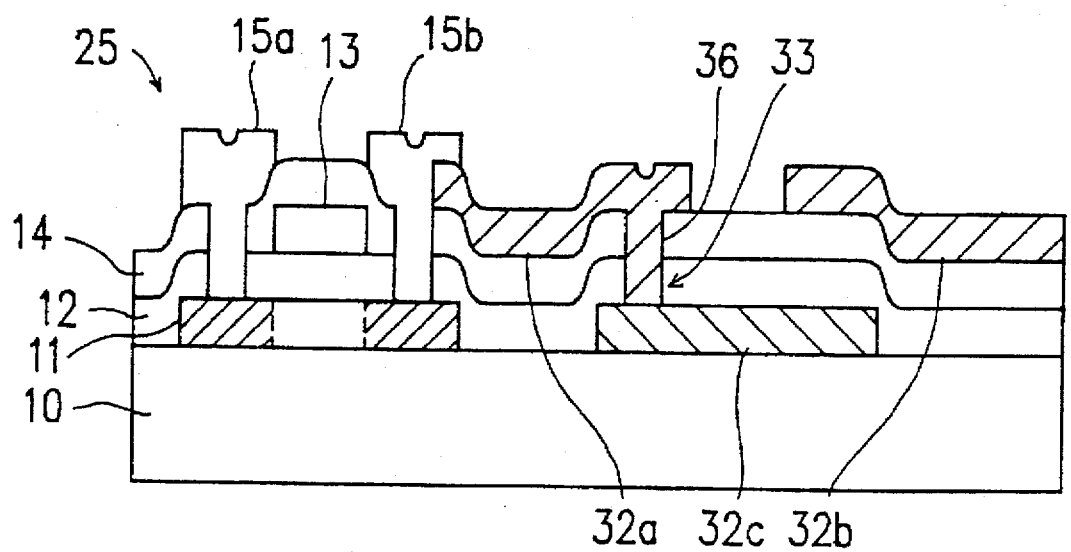
FIG. 5 is a cross-sectional view illustrating another modified example of the second example of the invention.

In addition, by providing a contact hole 36 through the interlevel insulating film 14 and the gate insulating film 12 in the overlapping portion 33 between the sub-pixel electrodes 32a and 32c so as to fill the inside of the contact hole 36 with ITO as shown in FIG. 5, the sub-pixel electrodes 32a and 32c can be electrically connected without using the capacitor. As a result, it is possible to enlarge the available range of the capacitor value in the overlapping portion 33.

Moreover, the sub-pixel electrodes 32a and 32b may be formed by a polycrystalline silicon thin film.

EXAMPLE 3

Figure 6A:
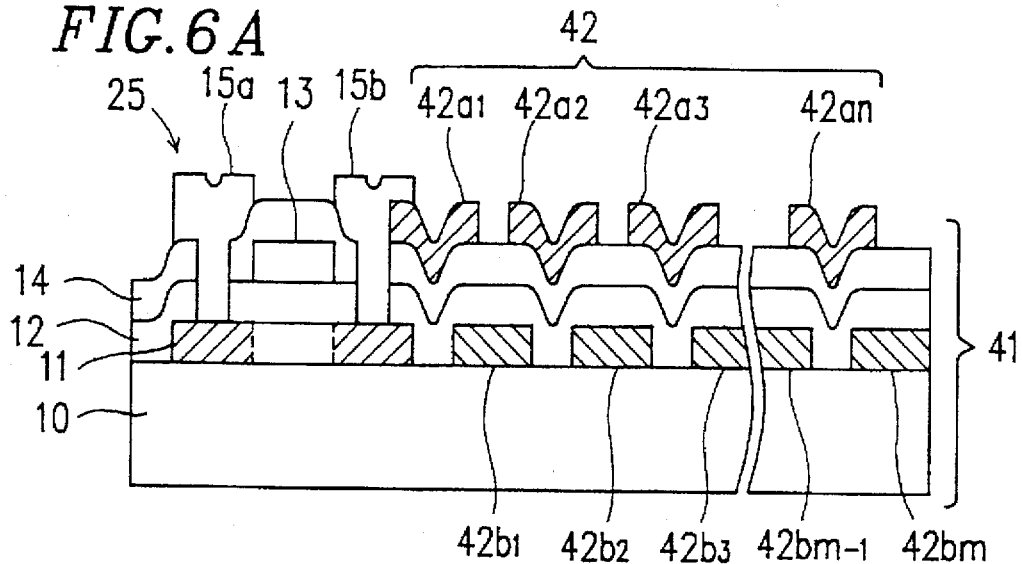
FIG. 6A is a cross-sectional view showing a configuration of a TFT substrate of a liquid crystal display apparatus according to a third example of the invention.
Figure 6B:
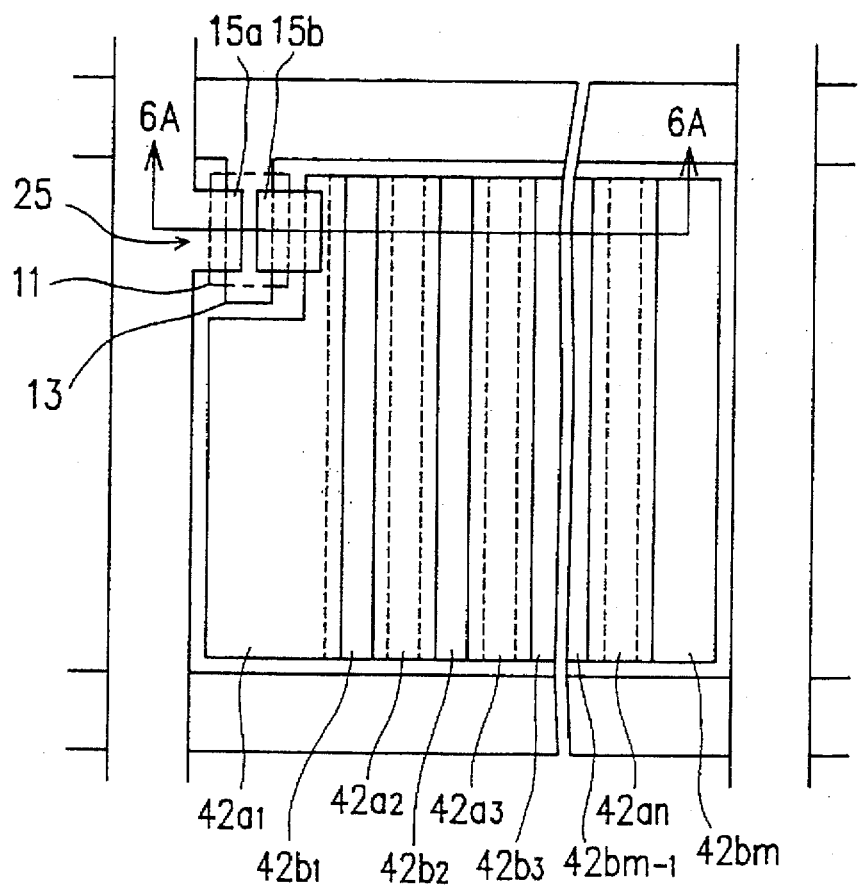
FIG. 6B is a plan view showing a configuration of a TFT substrate of a liquid crystal display apparatus according to the third example of the invention.

FIG. 6A is a cross-sectional view showing a configuration of a TFT substrate 41 for a liquid crystal display apparatus according to a third example of the invention, and FIG. 6B is a plan view thereof.

The LCD of this example is the same as the LCD 20 shown in FIG. 1A except that the TFT substrate 41 is used in place of the TFT substrate 26. The same components as those of the first example will be denoted by the same reference numerals.

As shown in FIG. 6A, a TFT 25 is formed on the first substrate 10, in the same way as in the first example. The LCD of the third example is different from the LCD of the first example in that the pixel electrode is divided into four or more portions. More specifically, sub-pixel electrodes $42a_1$ to $42a_n$ made of ITO are formed on the interlevel insulating film 14, and sub-pixel electrodes $42b_1$ to $42b_m$ made of poly-silicon are formed on the first substrate 10.

The parts of the respective sub-pixel electrodes $42a_1$ to $42a_n$ and the corresponding parts of the sub-pixel electrodes $42b_1$ to $42b_m$ are overlapped with each other via the interlevel insulating film 14 and the gate insulating film 12. A capacitor is formed in each of the overlapping portions. Accordingly, the sub-pixel electrodes $42a_1$ to $42a_n$ and $42b_1$ to $42b_m$ are electrically connected to each other via the capacitors.

Figure 7:
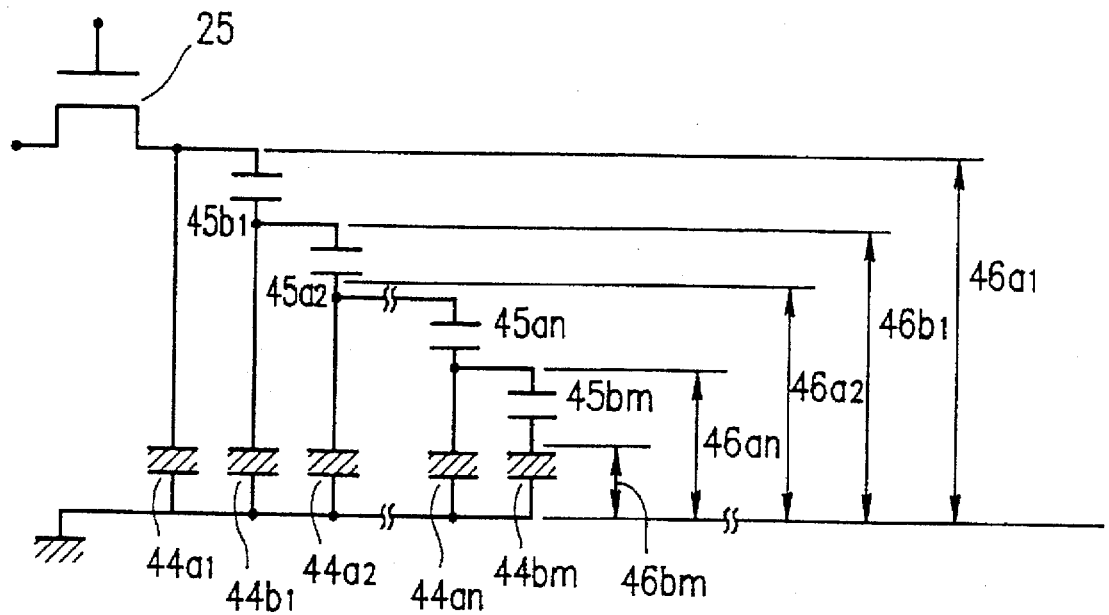
FIG. 7 is an equivalent circuit diagram corresponding to a pixel of the liquid crystal display apparatus according to the third example of the invention.

FIG. 7 shows an equivalent circuit corresponding to one pixel of a TFT-LCD using the TFT substrate 41 shown in FIG. 6A. In FIG. 7, the capacitors of the liquid crystal layer driven by the respective sub-pixel electrodes $42a_1$ to $42a_n$ and $42b_1$ to $42b_m$ are denoted by $44a_1$ to $44a_n$ and $44b_1$ to $44b_m$, while the capacitors formed in the respective overlapping portions among the sub-pixel electrodes are denoted by $45a_2$ to $45a_n$ and $45b_1$ to $45b_m$, respectively.

The voltages to be applied between the respective sub-pixel electrodes $42a_1$ to $42a_n$ and the counter electrode are different from the voltages to be applied between the respective sub-pixel electrodes $42b_1$ to $42b_m$ and the counter electrode as indicated by $46a_1$ to $46a_n$ and $46b_1$ to $46b_m$. Accordingly, by providing different voltage-transmittance characteristics for the sub-pixel electrodes, multiple regions having respectively different intensities of the fields to be applied to a liquid crystal layer can be formed within the one pixel. Therefore, by forming a region in which a transmittance is substantially saturated inside a pixel for a gray-scale tone display, the viewing angle of the LCD can be enlarged.

In addition, since the pixel electrode is composed of a larger number of sub-pixel electrodes as compared with that of a conventional pixel electrode, even if one of the capacitors $45a_2$ to $45a_n$ and $45b_1$ to $45b_m$ is short-circuited and the potentials of adjacent sub-pixel electrodes become equal, the defect does not become recognizable as a whole so long as the other sub-pixel electrodes operate normally. Accordingly, it is also possible to provide a redundancy for the pixel.

Figure 8:
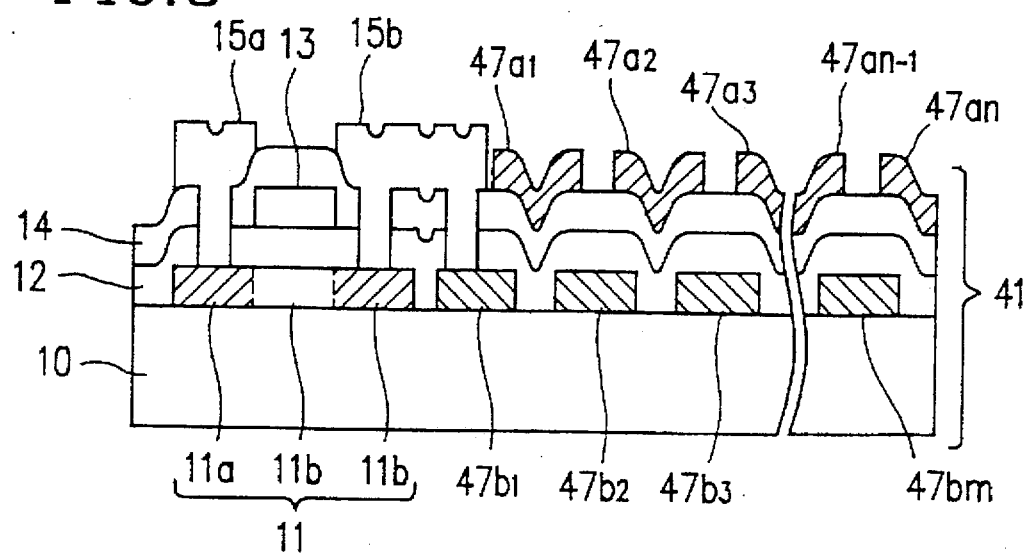
FIG. 8 is a cross-sectional view illustrating a modified example of the third example of the invention.

Alternatively, as shown in FIG. 8, by disposing the sub-pixel electrodes $47b_1$ to $47b_m$ made of poly-silicon in the first layer and the sub-pixel electrodes $47a_1$ to $47a_n$ made of ITO in the second layer, the drain electrode 15b may be electrically connected directly to the sub-pixel electrode $47b_1$. The drain region 11c and the sub-pixel electrode $47b_1$ may be fabricated so as to form a continuous layer and directly connected with each other without the drain electrode 15b.

Figure 9:
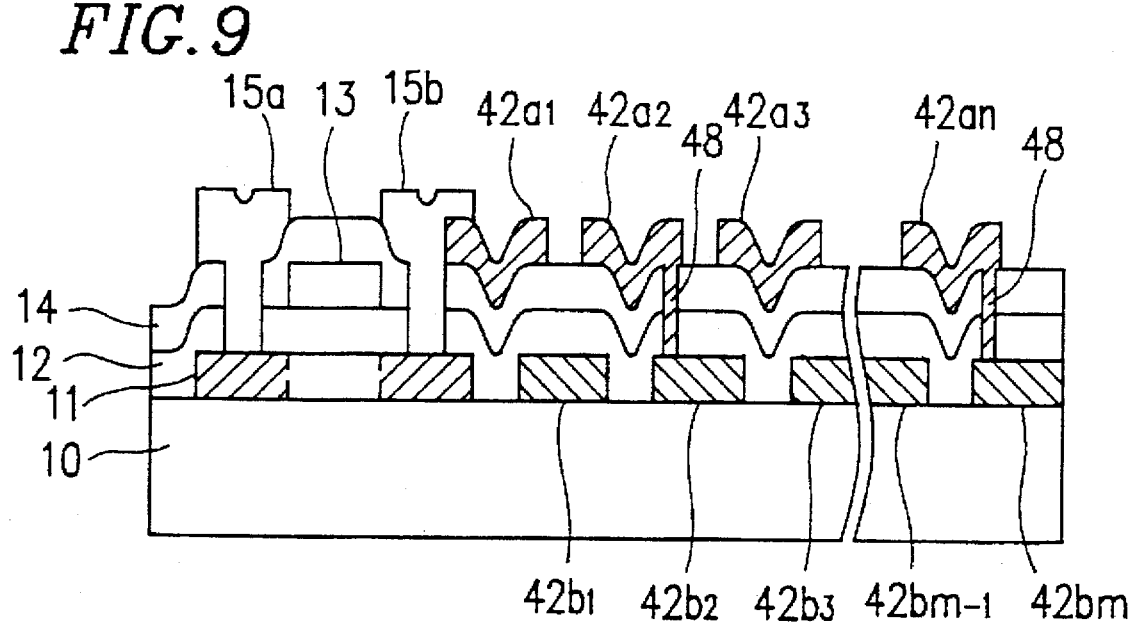
FIG. 9 is a cross-sectional view illustrating another modified example of the third example of the invention.

In addition, as shown in FIG. 9, by providing a contact hole 48 through the interlevel insulating film 14 and the gate insulating film 12 in the overlapping portions between the sub-pixel electrodes $42a_1$ to $42a_n$ and $42b_1$ to $42b_m$ so as to fill the inside of the contact hole 48 with ITO as shown in FIG. 9, the sub-pixel electrodes $42a_{1-n}$ to $42b_{1-m}$ can be electrically connected without using the capacitor. As a result, it is possible to enlarge the available range of the capacitor value in the overlapping portions.

Moreover, the sub-pixel electrodes $42a_1$ to $42a_n$ and $47a_1$ to $47a_n$ may be formed by a polycrystalline silicon thin film.

EXAMPLE 4

Figure 10A:
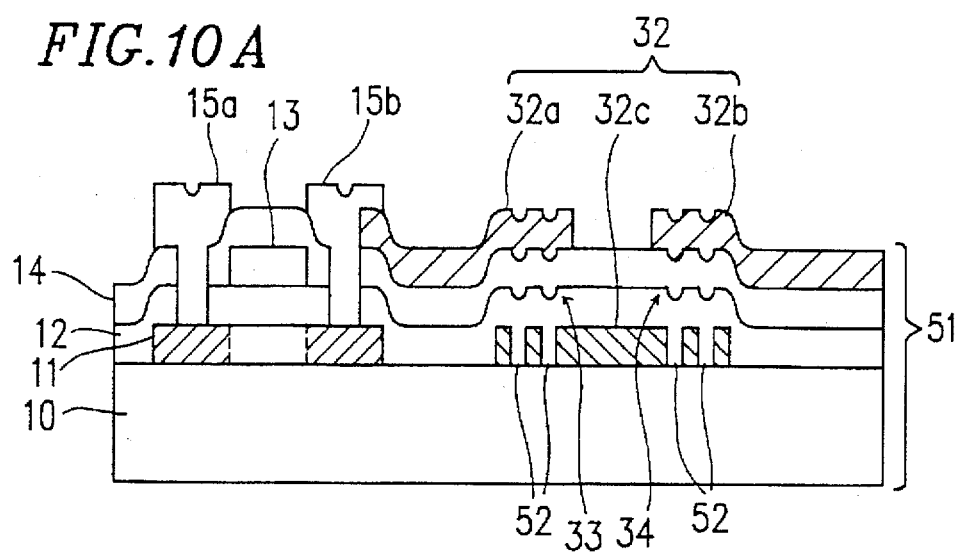
FIG. 10A is a cross-sectional view showing a configuration of a TFT substrate of a liquid crystal display apparatus according to a fourth example of the invention.
Figure 10B:
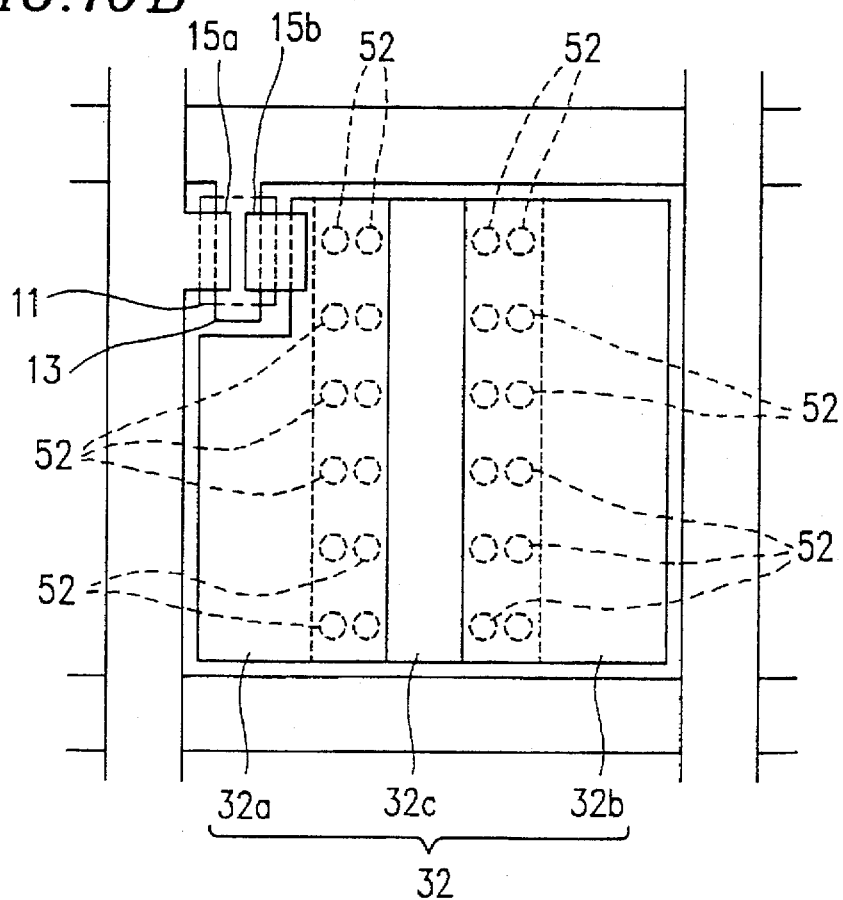
FIG. 10B is a plan view showing a configuration of a TFT substrate of a liquid crystal display apparatus according to the fourth example of the invention.

FIG. 10A is a cross-sectional view showing a configuration of a TFT substrate 51 for a liquid crystal display apparatus according to a fourth example of the invention, and FIG. 10B is a plan view thereof.

The LCD of this example is the same as the LCD shown in FIG. 3A except that the TFT substrate 51 is used in place of the TFT substrate 31. The same components as those of the second example will be denoted by the same reference numerals.

The TFT substrate 51 is different from the TFT substrate 31 in that holes 52 are provided in the overlapping portions between the sub-pixel electrode 32c and the sub-pixel electrode 32a and between the sub-pixel electrode 32c and the sub-pixel electrode 32b, and that the gate insulating film 12 is embedded in the holes 52.

If a TN type LCD is formed by using the TFT substrate having such a configuration, then the capacitor in the overlapping portions 33 and 34 can be adjusted in accordance with the number and the size of the holes. Therefore, it becomes possible to control the voltage to be applied to the sub-pixel electrodes 32a, 32b and 32c more precisely, and it is also possible to arbitrarily optimize the voltage to be applied to the sub-pixel electrodes depending on the usages and the characteristics of the liquid crystal layer, thereby enlarging the viewing angle.

As an alternative, the same effects can be obtained by providing holes in the parts of the sub-pixel electrodes 32a and 32b overlapping with parts of the sub-pixel electrode 32c.

This fourth example may be combined with the first example or the third example.

EXAMPLE 5

Figure 11:
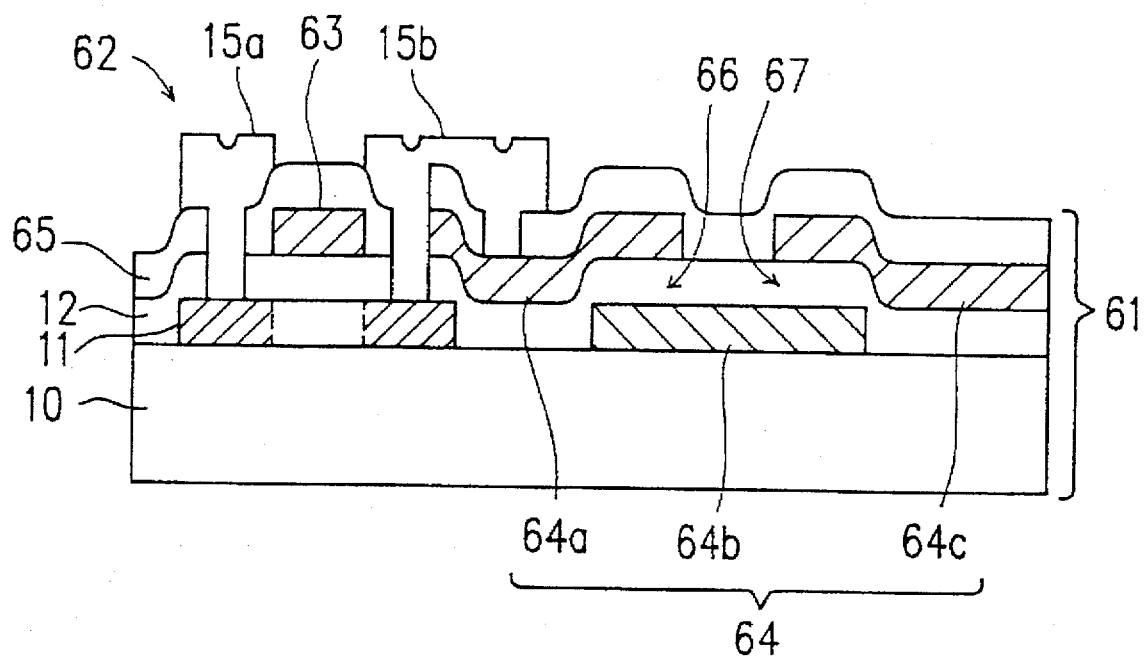
FIG. 11 is a cross-sectional view showing a configuration of a TFT substrate of a liquid crystal display apparatus according to a fifth example of the invention.

FIG. 11 is a cross-sectional view showing a configuration of a TFT substrate 61 for a liquid crystal display apparatus according to a fifth example of the invention.

In the TFT substrate 61, a TFT 62 is provided on the first substrate 10, and the TFT 62 includes a gate electrode 63 made of poly-silicon. A pixel electrode 64 is divided into three sub-pixel electrodes 64a, 64b and 64c made of poly-silicon. The sub-pixel electrodes 64a and 64c are formed during the same process step as the step for forming the gate electrode 63. As a result, the sub-pixel electrodes 64a and 64c are formed on the gate insulating film 12, and the parts of the sub-pixel electrodes 64a and 64c are overlapped with the parts of sub-pixel electrode 64b via the gate insulating film 12. Therefore, capacitors are formed in the overlapping portions 66 and 67. An interlevel insulating film 65 is formed so as to cover the gate electrode 63, and the sub-pixel electrodes 64a and 64c.

This TFT substrate 61 is fabricated in the following manner.

After forming the gate insulating film 12 on the first substrate 10 in accordance with the fabrication method of the first example, a poly-silicon film containing an impurity is formed and then patterned in a predetermined shape, thereby forming the gate electrode 63, and the sub-pixel electrodes 64a and 64c on the gate insulating film 12. In this case, the thickness of the poly-silicon film containing an impurity is preferably equal to or smaller than 150 nm so that the poly-silicon film is provided with a sufficient transmittance with respect to the visible light. Alternatively, a polysilicon film having a thickness (several hundred nm) allowing for sufficiently reducing the resistance of the gate electrode 63 may be formed; patterned in a predetermined shape; and then etched so that the thickness of the portions to be the sub-pixel electrodes 64a and 64c becomes equal to or smaller than about 150 nm. Thereafter, an interlevel insulating film 65 is formed so as to cover the gate electrode 63 and the sub-pixel electrodes 64a and 64c. The remaining process steps are the same as those of the first example.

In the LCD having the above-described configuration, the pixel electrode 64 is divided into the double-layered sub-pixel electrodes 64a, 64b and 64c which are electrically connected to each other via the capacitor. As a result, the voltage between the sub-pixel electrode 64a and the counter electrode; the voltage between the sub-pixel electrode 64b and the counter electrode; and the voltage between the sub-pixel electrode 64c and the counter electrode are different from one another within the one pixel. Accordingly, by providing different voltage-transmittance characteristics for the respective sub-pixel electrodes, a plurality of regions having different intensities of the fields to be applied to the liquid crystal layer can be formed within the one pixel. Therefore, by forming a region in which a transmittance is substantially saturated inside a pixel for a gray-scale tone display, the viewing angle of the LCD can be enlarged.

In addition, the sub-pixel electrode 64b is formed at the same time as the formation of the semiconductor layer 11 constituting a part of the TFT 62, and in addition, the sub-pixel electrodes 64a and 64c are formed at the same time as the formation of the gate electrode 63 constituting a part of the TFT 62, so that the number of the process steps for fabricating the TFT substrate 61 can be reduced. In addition, since the gate electrode 63 of the TFT is a polycrystalline silicon thin film, i.e., a transparent semiconductor thin film, it is possible to prevent the reduction of the numerical aperture of the pixels, which has adversely been caused in the case of using a non-transparent gate electrode material for forming the capacitor in a conventional single-layered structure pixel electrode.

This fifth example may be combined with the second example, as well as with the first, third or fourth example.

The foregoing five examples of the invention have been described as being applied to a top-gate type TFT. The same effects as those of the examples can also be obtained in the case where these examples are applied to a bottom-gate type TFT.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus comprising:
   a liquid crystal layer;
   a first substrate and a second substrate interposing the liquid crystal layer therebetween;
   a pixel electrode and a counter electrode respectively provided on opposing faces of the first substrate and the second substrate for applying a voltage to the liquid crystal layer; and
   a thin-film transistor provided on the first substrate and electrically connected to the pixel electrode, the thin-film transistor including a semiconductor layer having a source region and a drain region,
   wherein the pixel electrode is divided into a first sub-pixel electrode and a second sub-pixel electrode; parts of the first and second sub-pixel electrodes are overlapped via an insulating layer with each other; and at least one of the first and second sub-pixel electrodes is made of the same transparent material as a material for the semiconductor layer.

2. A liquid crystal display apparatus according to claim 1, wherein at least one of the first and second sub-pixel electrodes is divided into a plurality of sub-pixel electrode portions.

3. A liquid crystal display apparatus according to claim 1, wherein the semiconductor layer and at least one of the first and second sub-pixel electrodes are made of polycrystalline silicon.

4. A liquid crystal display apparatus according to claim 1, wherein the first sub-pixel electrode has a hole in a portion thereof overlapping the second sub-pixel electrode, and the insulating layer is embedded in the hole.

5. A liquid crystal display apparatus according to claim 1, wherein a through hole is provided through the insulating layer interposed between the first sub-pixel electrode and the second sub-pixel electrode, and the first and second sub-pixel electrodes are electrically connected to each other via the through hole.

6. A liquid crystal display apparatus according to claim 1, wherein the liquid crystal layer is made of a TN type liquid crystal.

7. A liquid crystal display apparatus according to claim 1, wherein the thin-film transistor has a top-gate structure or a bottom-gate structure.

8. A liquid crystal display apparatus comprising:
   a liquid crystal layer;
   a first substrate and a second substrate interposing the liquid crystal layer therebetween;
   a pixel electrode and a counter electrode respectively provided on opposing faces of the first substrate and the second substrate for applying a voltage to the liquid crystal layer; and
   a thin-film transistor provided on the first substrate and electrically connected to the pixel electrode, the thin-film transistor having a gate electrode,
   wherein the pixel electrode is divided into a first sub-pixel electrode and a second sub-pixel electrode; parts of the first and second sub-pixel electrodes are overlapped via an insulating layer with each other; and at least one of the first and second sub-pixel electrodes is made of the same transparent material as a material for the gate electrode.

9. A liquid crystal display apparatus according to claim 8, wherein at least one of the first and second sub-pixel electrodes is divided into a plurality of sub-pixel electrode portions.

10. A liquid crystal display apparatus according to claim 8, wherein the gate electrode and at least one of the first and second sub-pixel electrodes are made of polycrystalline silicon.

11. A liquid crystal display apparatus according to claim 8, wherein the first sub-pixel electrode has a hole in a portion thereof overlapping the second sub-pixel electrode, and the insulating layer is embedded inside the hole.

12. A liquid crystal display apparatus according to claim 8, wherein a through hole is provided through the insulating layer interposed between the first sub-pixel electrode and the second sub-pixel electrode, and the first and second sub-pixel electrodes are electrically connected to each other via the through hole.

13. A liquid crystal display apparatus according to claim 8, wherein the liquid crystal layer is made of a TN type liquid crystal.

14. A liquid crystal display apparatus according to claim 8, wherein the thin-film transistor has a top-gate structure or a bottom-gate structure.

* * * * *